(12) United States Patent
Staller (10) Patent No.: US 12,512,872 B2
(45) Date of Patent: Dec. 30, 2025

(54) SIGNAL-SENSING AUTOMATIC DEVICE CONFIGURATOR

(71) Applicant: Performance Telecomm, Marina Del Rey, CA (US)

(72) Inventor: Brian Keith Staller, Marina Del Rey, CA (US)

(73) Assignee: Performance Telecomm, Marina Del Rey, CA (US)

( * ) Notice: Subject to any disclaimer, the term of this patent is extended or adjusted under 35 U.S.C. 154(b) by 396 days.

(21) Appl. No.: 18/093,089

(22) Filed: Jan. 4, 2023

(65) Prior Publication Data

US 2023/0223979 A1     Jul. 13, 2023

Related U.S. Application Data

(60) Provisional application No. 63/297,612, filed on Jan. 7, 2022.

(51) Int. Cl.
  *H04B 1/40*     (2015.01)
  *H04B 1/403*    (2015.01)

(52) U.S. Cl.
  CPC .................................. *H04B 1/406* (2013.01)

(58) Field of Classification Search
  CPC ........................................................ H04B 1/406
  USPC ........................................................ 455/553.1
  See application file for complete search history.

(56) References Cited

U.S. PATENT DOCUMENTS

| 2010/0272270 A1* | 10/2010 | Chaikin | H04R 29/001 381/59 |
| 2011/0004716 A1* | 1/2011 | Staal | G06F 13/385 710/301 |
| 2021/0084122 A1* | 3/2021 | Lake | H04L 12/66 |

* cited by examiner

*Primary Examiner* — Tanmay K Shah
(74) *Attorney, Agent, or Firm* — ALONZO&ASSOCIATES; Arlyn Alonzo (57) ABSTRACT

Aspects of the disclosure are directed to an automatic device configurator. In accordance with one aspect, the automatic device configurator includes external switch inputs configured to set one or more configuration parameters; a configuration status input configured to be compatible with a standard interface; an output port; and a central processing unit (CPU) coupled to the output port, the external switch inputs and the configuration status input, wherein the CPU is configured to send configuration commands based on the one or more configuration parameters.

3 Claims, 7 Drawing Sheets

SIGNAL-SENSING AUTOMATIC DEVICE CONFIGURATOR

CLAIM OF PRIORITY UNDER 35 U.S.C. § 119

The present Application for Patent claims priority to Provisional Application No. 63/297,612 entitled "SIGNAL-SENSING AUTOMATIC DEVICE CONFIGURATOR" filed Jan. 7, 2022, and assigned to the assignee hereof and hereby expressly incorporated by reference herein.

TECHNICAL FIELD

This disclosure relates generally to the field of signal processing, and, in particular, to a signal-sensing automatic device configurator.

BACKGROUND

Signal processing systems and networks are used to convey information content from signal sources to clients over a physical medium. For example, an audio source may be used as a source of music or other audio content that is distributed to a plurality of clients. In many scenarios, the output signal of the audio source may need to be further processed by an output device before delivery of an audible sound signal to the plurality of clients. For example, the output device may be an amplifier (to boost an audio signal) connected to a plurality of speakers in a room or several rooms. However, the output device, or amplifier, requires a separate configuration for proper operation with the audio source. It would be desirable to have a solution which configures the output device automatically by sensing an output signal of the audio source.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a signal-sensing automatic device configurator. Accordingly, an apparatus including a plurality of external switch inputs configured to set one or more configuration parameters; a configuration status input configured to be compatible with a standard interface; an output port; and a central processing unit (CPU) coupled to the output port, the plurality of external switch inputs and the configuration status input, wherein the CPU is configured to send a plurality of configuration commands based on the one or more configuration parameters.

In one example, the standard interface is one of the following: a Sony Philips Digital Interface (SPDIF or S/PDIF), a Toshiba Link (TOSLINK) interface or an analog interface. In one example, the output port is coupled to an output device. In one example, the output port is an infrared (IR) emitter. In one example, the CPU is further configured to send the plurality of configuration commands based on a sensed input state. In one example, the sensed input state is one of the following: a Sony Philips Digital Interface (SPDIF) input state, a Toshiba Link (TOSLINK) input state, or an analog input state. In one example, the one or more configuration parameters include at least one of the following: a receiver brand name, an input selection, a volume level, a volume command, a digital signal processor (DSP) command, an auto off time interval or an auto off enable.

In one example, the apparatus further includes a preprogrammed database coupled to the CPU. In one example, the preprogrammed database is configured to provide a preprogrammed IR database for each unique receiver brand name specified in the receiver brand name.

In one example, the plurality of external switch inputs is further configured to select an input on the output device. In one example, the CPU is configured to monitor a plurality of standard interfaces simultaneously at the configuration status input. In one example, the CPU is further configured to set an input setting depending on which one of the plurality of standard interfaces is active. In one example, the CPU is further configured to detect an audio volume based on a first input volume sensitivity threshold and to detect no-audio volume following a time interval based on a second input volume sensitivity threshold. In one example, the CPU executes an audio detection algorithm to detect the audio volume or the no-audio volume.

Another aspect of the disclosure provides a system including an automatic configuration controller including: a) a plurality of external switch inputs configured to set one or more configuration parameters; b) a configuration status input configured to be compatible with a standard interface; c) an output port; d) a central processing unit (CPU) coupled to the output port, the plurality of external switch inputs and the configuration status input, wherein the CPU is configured to send a plurality of configuration commands based on the one or more configuration parameters and configured to send the plurality of configuration commands based on a sensed input state; and e) a preprogrammed database coupled to the CPU, wherein the preprogrammed database is configured to provide a preprogrammed IR database for each unique receiver brand name specified in a receiver brand name; an audio distributor configured to provide an input state to the configuration status input; and an output device configured to receive a plurality of configuration commands from the output port.

In one example, the system further includes a configuration path coupled to the output device and the output port. In one example, the configuration path transports the plurality of configuration commands.

Another aspect of the disclosure provides a method including setting a plurality of configuration parameters; connecting an audio output signal to a configuration status input; sensing an input state based on the audio output signal to generate a sensed input state; and send a plurality of configuration commands from an output port to an output device based on the sensed input state and the plurality of configuration parameters.

In one example, the method of claim further includes connecting an emitter to the output port. In one example, the method of claim further includes monitoring for silence and reconfigure the output device. In one example, the method of claim further includes checking sound status based on the sensed input state. In one example, the method of claim further includes turning off the output device if an automatic off enable/disable state is enabled.

In one example, the configuration status input is compatible with a Sony Philips Digital Interface (SPDIF) interface, a Toshiba Link (TOSLINK) interface or an analog interface. In on example, the plurality of configuration parameters includes one or more of the following: output device type state, automatic off enable/disable state, automatic off hysteresis duration state, DSP enable state, volume control enable state, initial volume level state, automatic off hysteresis duration state, or input sensitivity state. In on example, the plurality of configuration commands is based on one or more of the following: receiver brand name, input selection, volume level, volume command, digital signal processor (DSP) command, auto off time interval, or auto off enable.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
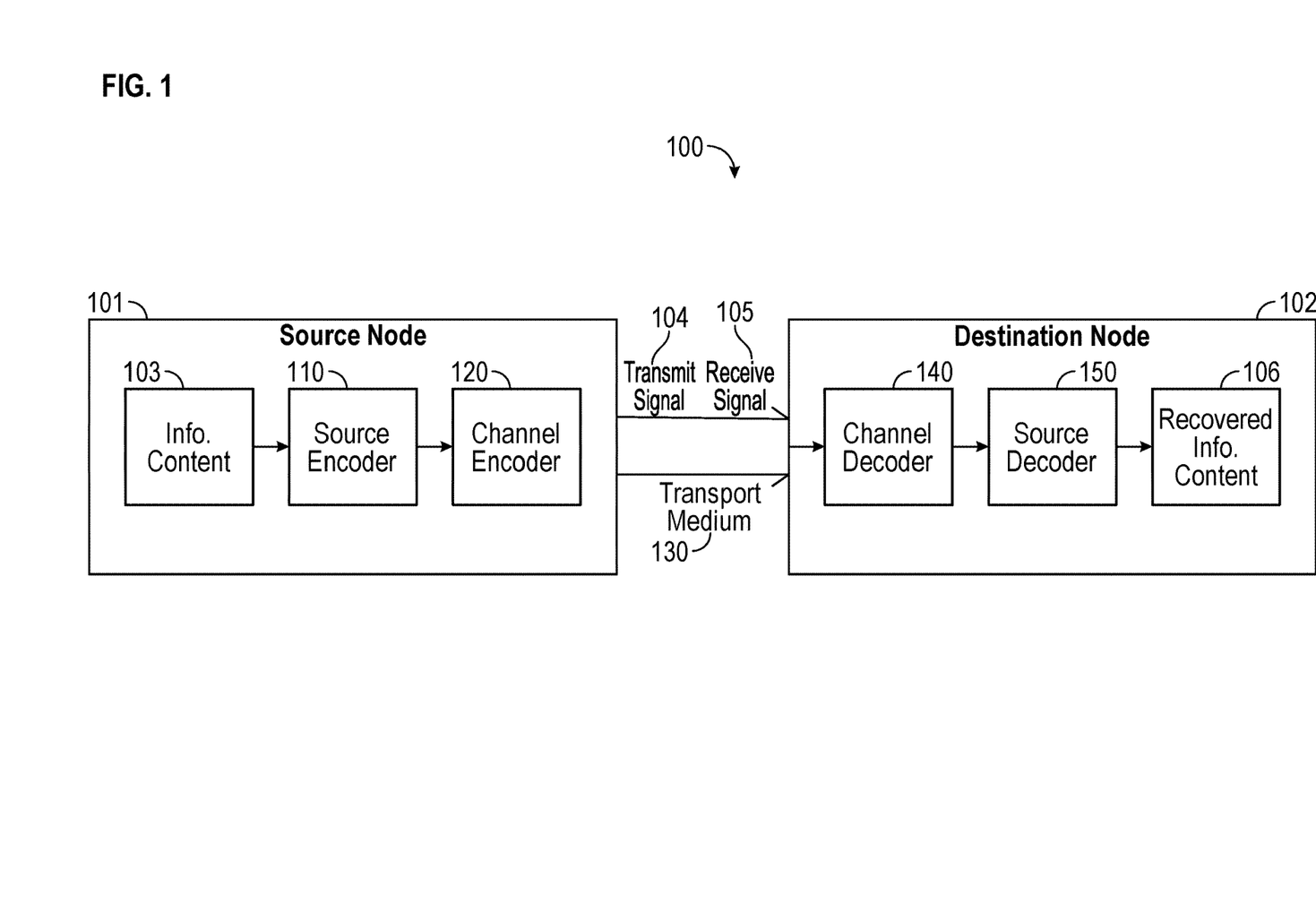
FIG. 1 illustrates an example universal architectural model for a signal processing system.

FIG. 1 illustrates an example universal architectural model for a signal processing system 100. In one example, the universal architectural model for a signal processing system as illustrated in FIG. 1 may represent any signal processing system, digital or analog, and may use any transport medium for transport, wired or wireless. The purpose of the signal processing system is to manipulate and transport information content 103 from a source node 101 to a destination node 102 (or a plurality of destination nodes) over a transport medium 130 in a reliable, efficient, timely and secure manner. As shown in FIG. 1, the information content 103 undergoes two generic processing steps at the source node 101: source encoding by a source encoder 110 and channel encoding by a channel encoder 120 to produce a transmit signal 104. After transmission over the transport medium 130, a receive signal 105, related to the transmit signal 104, is processed at the destination node 102 to produce a recovered information content 106. In one example, the destination node 102 includes two generic processing steps which are inverses of the source processing steps: channel decoding by a channel decoder 140 and source decoding by a source decoder 150.

Figure 2:
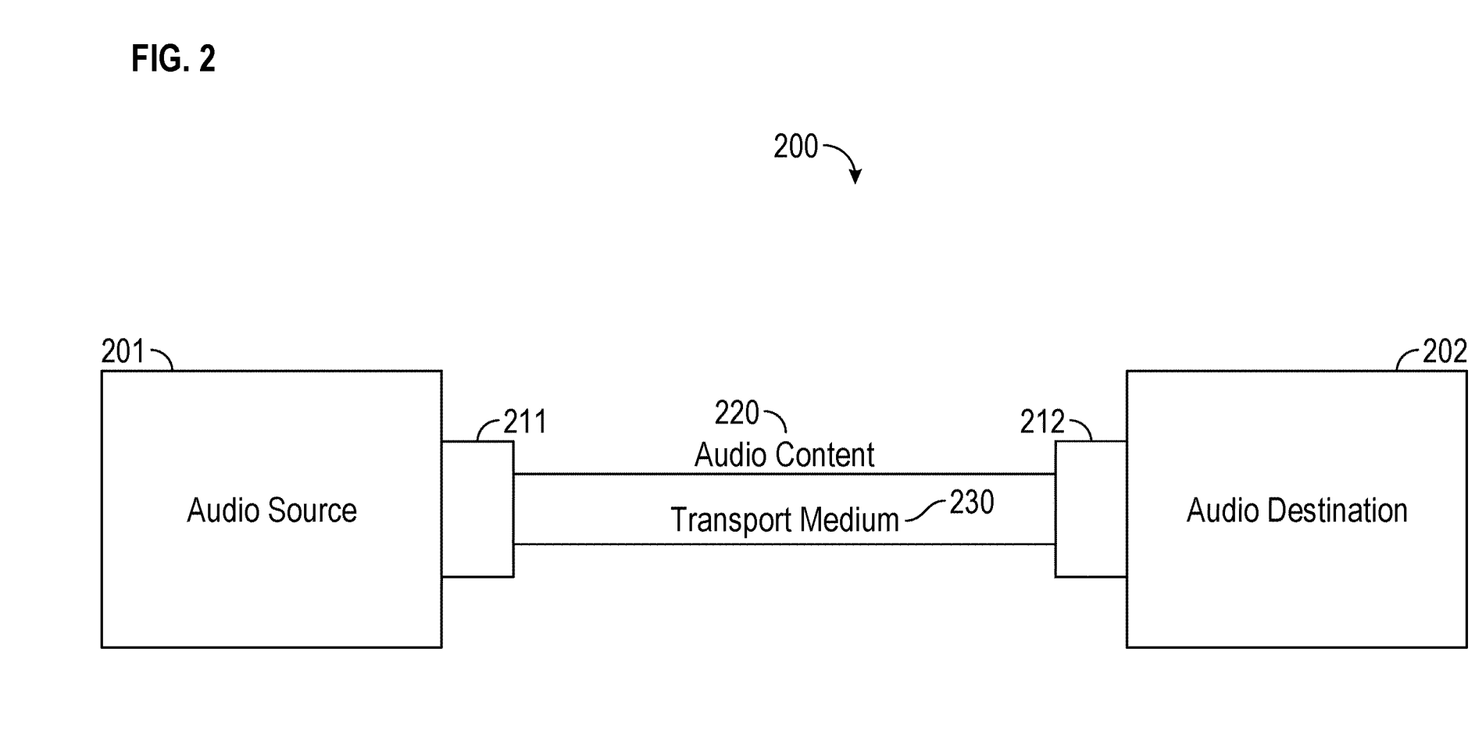
FIG. 2 illustrates an example of a signal processing system.

FIG. 2 illustrates an example of a signal processing system 200. In one example, FIG. 2 illustrates a more detailed processing system which manipulates and transports audio content 220 from an audio source 201 to an audio destination 202 (or a plurality of audio destinations) over a transport medium 230. In one example, the transport medium 230 may be wired or wireless. The audio source 201 may be, for example, a compact disc (CD) player, a digital audio player, MP3 (MPEG audio layer III) player, stored digital audio content hosted in a networked device, audio signal from a video device, digital media files, phonograph, an audio device, etc. The audio source 201 produces audio content 220 at an audio source output port 211. In one example, the audio content 220 may be in various formats. For example, the audio content 203 may be in a digital format or in an analog format.

In one example, the audio source output port 211 may be compatible with various interface types. For example, the audio source output port 211 may be a Sony Philips Digital Interface (SPDIF) interface, a Toshiba Link (TOSLINK) interface, an analog interface, or another standard interface. For example, a SPDIF interface is a digital audio standard interface using a wired (e.g., cabled) transport medium. In one example, the SPDIF interface is a digital audio interface using a coaxial cable medium. For example, a TOSLINK interface is a digital audio standard interface using a fiber optic transport medium. For example, an analog interface is an analog audio interface using a coaxial cable medium (e.g., RCA cable). In one example, the analog interface includes two or more coaxial cables to transport, for example stereophonic or multi-channel audio signals.

In one example, the audio content 220 is received by the audio destination 202 at an audio destination input port 212. In one example, the audio destination input port 212 may be compatible with various interface types. For example, the audio destination input port 212 may be a SPDIF interface, a TOSLINK interface, an analog interface, or another standard interface.

Figure 3:
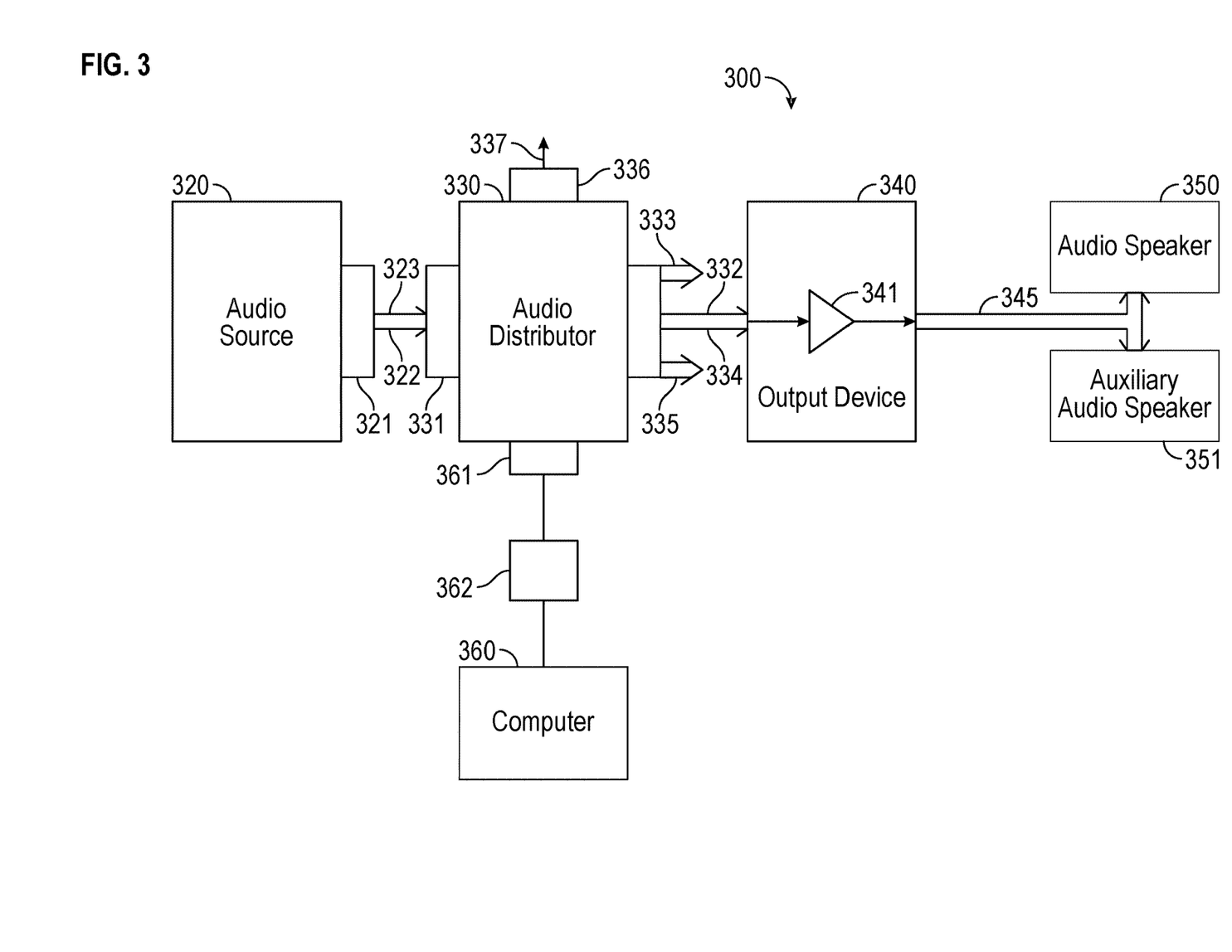
FIG. 3 illustrates an example digital audio distribution system.

FIG. 3 illustrates an example digital audio distribution system 300. In one example, an audio source 320 provides audio content at an audio source output port 321. For example, the audio source 320 may be a compact disc (CD) player, a digital audio player, a MP3 (MPEG audio layer III) player, stored digital audio content hosted in a networked device, audio signal from a video device, digital media files, phonograph, an audio device, etc. In one example, the audio source 320 produces an input audio signal 323. For example, the input audio signal 323 is in an analog format. For example, the input audio signal 323 is in a digital format.

In one example, the input audio signal 323 is transported over an input audio medium 322. For example, the input audio medium 322 may be compatible with a SPDIF interface, a TOSLINK interface, an analog interface, or another standard interface. For example, the input audio medium 322 may be a wired medium (e.g., coaxial cable, fiber optic cable, etc.) or a wireless medium (e.g., WiFi, Bluetooth, etc.).

In one example, an audio distributor 330 receives the input audio signal 323 from the input audio medium 322 at an audio distribution input port 331. For example, the audio distributor 330 is a multicast device which transmits a plurality of output audio signals 333 to a plurality of client devices. In one example, the plurality of output audio signals 333 are replicas of the input audio signal 323. For example, a replica is a copy or a close approximation of another signal. For example, the replica may be a time-delayed and/or scaled version of another signal.

For example, the audio distributor 330 is connected to a computer 360 over a digital interface 361. In one example, the digital interface 361 is compatible with an Ethernet protocol (wired or wireless). In one example, the digital interface 361 is connected to a network switch node 362 (e.g., router, switch, bridge, etc.) within the connection to the computer 360.

In one example, the audio distributor 330 includes a plurality of output ports 335. For example, the plurality of output ports 335 may be compatible with a SPDIF interface, a TOSLINK interface, an analog interface, or another standard interface. For example, the plurality of output ports 335 may be connected to an output audio medium 332. For example, the output audio medium 332 may be a wired medium (e.g., coaxial cable, fiber optic cable, etc.) or a wireless medium (e.g., WiFi, Bluetooth, etc.). For example, the output audio medium 332 carries a selected output audio signal 334 from the plurality of output audio signals 333. In one example, the selected output audio signal 334 is compatible with one of a SPDIF interface, a TOSLINK interface, or an analog interface.

In one example, one port of the plurality of output ports 335 is connected to an output device 340. For example, the output device 340 is an audio amplifier 341 which amplifies the selected output audio signal 334 to produce an amplified output audio signal 345. For example, the amplified output audio signal 345 may be transported to an audio speaker 350. For example, the amplified output audio signal 345 may be transported to an auxiliary audio speaker 351, for example, a sub-woofer speaker. In another example, the output device 340 is an audio video receiver (AVR).

In one example, the audio distributor 330 includes an output status interface 336. For example, the output status interface 336 provides a plurality of output status signals 337. For example, the plurality of output status signals 337 may include on/off status, fault status, other status, etc.

Figure 4:
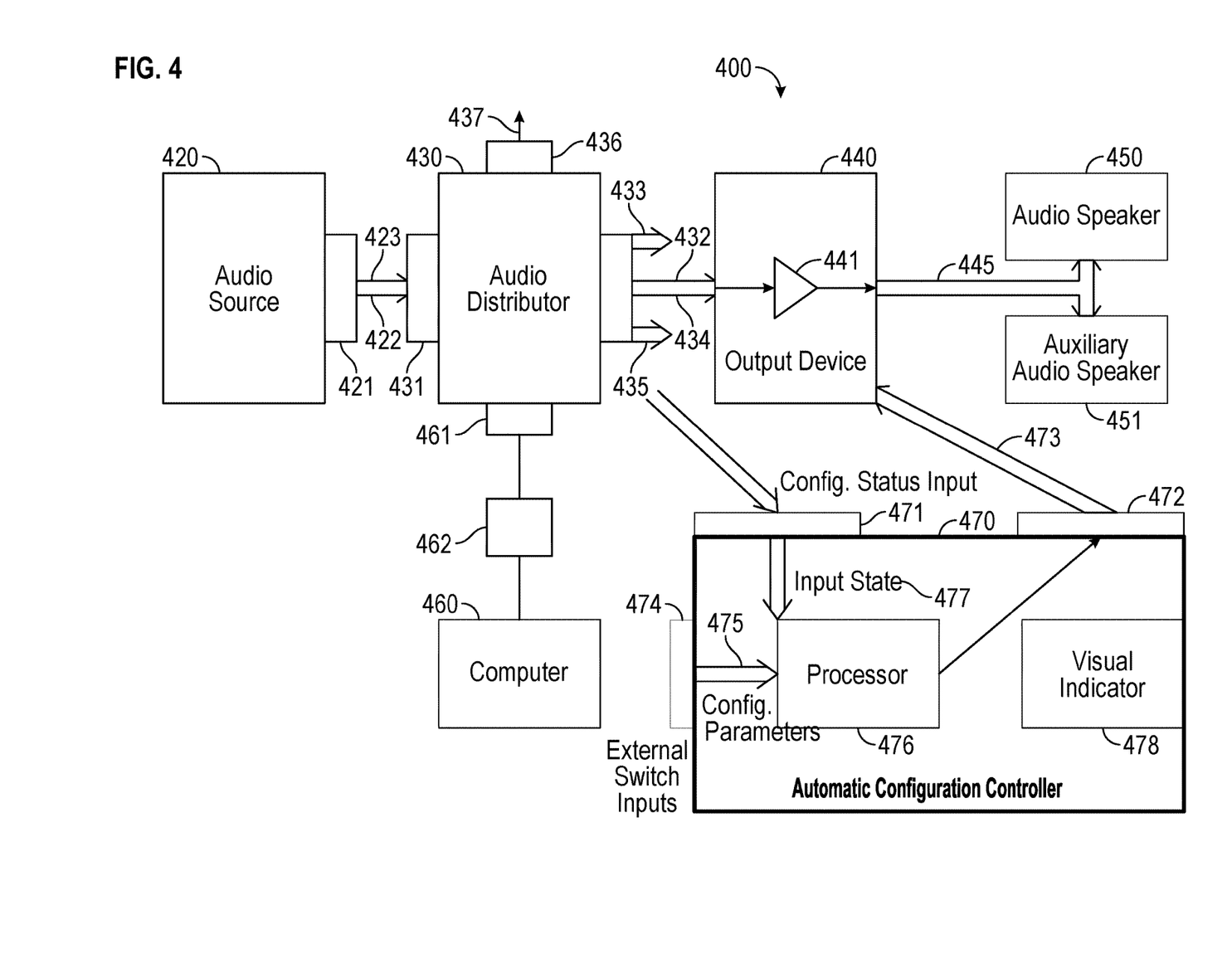
FIG. 4 illustrates an example of an automatically configured digital audio distribution system.

FIG. 4 illustrates an example of an automatically configured digital audio distribution system 400. In one example, an audio source 420 provides audio content at an audio source output port 421. In one example, the audio source 420 produces an input audio signal 423. For example, the input audio signal 423 is in an analog format. For example, the input audio signal 423 is in a digital format. In one example, the input audio signal 423 is transported over an input audio medium 422. For example, the input audio medium 422 may be compatible with a SPDIF interface, a TOSLINK interface, an analog interface, or another standard interface. For example, the input audio medium 422 may be a wired medium (e.g., coaxial cable, fiber optic cable, etc.) or a wireless medium (e.g., WiFi, Bluetooth, etc.).

In one example, an audio distributor 430 receives the input audio signal 423 over the input audio medium 422 at an audio distribution input port 431. For example, the audio distributor 430 is a multicast device which transmits a plurality of output audio signals 433 to a plurality of client devices. For example, the audio distributor 430 is connected to a computer 460 over a digital interface 461. In one example, the digital interface 461 is compatible with an Ethernet protocol (wired or wireless). In one example, the digital interface 461 is connected to a network switch node 462 (e.g., router, switch, bridge, etc.).

In one example, the audio distributor 430 includes a plurality of output ports 435. For example, the plurality of output ports 435 may be compatible with a SPDIF interface, a TOSLINK interface, an analog interface, or another standard interface. For example, the plurality of output ports 435 may be connected to an output audio medium 432. For example, the output audio medium 432 may be a wired medium (e.g., coaxial cable, fiber optic cable, etc.) or a wireless medium (e.g., WiFi, Bluetooth, etc.). For example, the output audio medium 432 carries a selected output audio signal 434 from the plurality of output audio signals 433. In one example, the selected output audio signal 434 is compatible with one of a SPDIF interface, a TOSLINK interface, or an analog interface.

In one example, one port of the plurality of output ports 435 is connected to an output device 440. For example, the output device 440 is an audio amplifier 441 which amplifies the selected output audio signal 434 to produce an amplified output audio signal 445. For example, the amplified output audio signal 445 may be transported to an audio speaker 450. For example, the amplified output audio signal 445 may be transported to an auxiliary audio speaker 451, for example, a sub-woofer speaker. In another example, the output device 440 is an audio video receiver (AVR).

In one example, the audio distributor 430 includes an output status interface 436. For example, the output status interface 436 provides a plurality of output status signals 437. For example, the plurality of output status signals 437 may include on/off status, fault status, other status, etc.

In one example, an automatic configuration controller 470 augments the digital audio distribution system 300 of FIG. 3 to implement the automatically configured digital audio distribution system 400. For example, the automatic configuration controller 470 may be used to automatically configure the output device 440 upon sensing an input state 477 of the audio distributor 430 at a configuration status input 471. For example, the input state 477 may be an indication of an output status of the plurality of output ports 435. For example, the plurality of output ports 435 may be compatible with a SPDIF interface, a TOSLINK interface, an analog interface, or another standard interface. In one example, the output status may indicate a compatibility status of the selected output audio signal 434. For example, the compatibility status may indicate whether a SPDIF interface, a TOSLINK interface, or an analog interface is compatible with the selected output audio signal 434.

In one example, the automatic configuration controller 470 may send a plurality of configuration commands 472 to the output device 440. For example, the plurality of configuration commands 472 may be transported to the output device 440 via a configuration path 473. In one example, the configuration path 473 is a directly wired path. For example, the directly wired path may use infrared (IR) transmission over an IR transmission line to the output device 440. In another example, the configuration path 473 is an indirectly wired path using an infrared (IR) emitter near the output device 440 to illuminate an IR aperture of the output device 440. For example, the plurality of configuration commands 472 are received by the output device 440 over the configuration path 473 to configure the output device 440.

In one example, the plurality of configuration commands 472 include power on/off commands to the output device 440. In another example, the plurality of configuration commands 472 include an input configuration command to set a signal input of the output device 440 according to the compatibility status of the selected output audio signal 434 sent to the output device 440. For example, the compatibility status may indicate whether a SPDIF interface, a TOSLINK interface, or an analog interface is compatible with the selected output audio signal 434.

In another example, the plurality of configuration commands 472 include sound processing configuration information (e.g., DSP setting) to set a proper sound setting for the output device 440. For example, the plurality of configuration commands 472 includes a volume setting state for the output device 440.

In one example, the automatic configuration controller 470 also includes a plurality of external switch inputs 474 to set configuration parameters 475. For example, the plurality of external switch inputs 474 may be a plurality of dual inline package (DIP) switches. For example, each external switch input has a configurable binary state (e.g., off or on, 0 or 1, yes or no, high or low, etc.) set by manual control.

In one example, the configuration parameters 475 may represent an output device type state to indicate the type of output device 440. For example, the output device type state may be represented by a plurality of binary digits. For example, if the plurality of binary digits has a size of 4 bits, up to 16 possible types for output device 440 may be represented.

In one example, the configurations parameters 475 may represent an automatic off enable/disable state. For example, the automatic off enable/disable state allows powering off the output device 440 autonomously after a programmable time duration.

In one example, the configuration parameters 475 may represent automatic off hysteresis duration state. For example, the automatic off hysteresis duration state sets the automatic off hysteresis duration of the output device 440 to one of two preselected binary digits may have a size of N bits to indicate one of up to $2^N$ possible types for output values.

In one example, the configuration parameters 475 may represent a DSP enable state. For example, the DSP enable state may allow an all-channel stereo command if the output device 440 allows it. In one example, the configuration parameters 475 may represent a volume control enable state. For example, the volume control enable state allows autonomous volume control of the output device 440.

In one example, the configuration parameters 475 may represent an initial volume level state. For example, the initial volume level state sets the initial volume level of the output device 440 to one of two volume levels. In one example, the configuration parameters 475 may represent an input sensitivity state. For example, the input sensitivity state sets the input sensitivity level of the output device 440 to one of two sensitivity levels.

In one example, upon sensing the input state 477 of the audio distributor 430 at the configuration status input 471 and upon sensing the configuration parameters 475 set by the plurality of external switch inputs 474, the automatic configuration controller 470 sends the plurality of configuration commands 472 to the output device 440 via configuration path 473. In one example, the plurality of configuration commands 472 is set by the input state 477 of the audio distributor 430 at the configuration status input 471 and by the configuration parameters 475 set by the plurality of external switch inputs 474 using a processor 476.

In one example, the sending of the plurality of configuration commands 472 to output device 440 is executed autonomously, i.e., without manual intervention. In one example, the output device 440 autonomously receives the plurality of configuration commands 472 via the configuration path 473 and autonomously configures its internal state based on the plurality of configuration commands 472.

For example, based on the state of the power on/off command and if the automatic off enable/disable state is enabled, the output device 440 may be autonomously powered on or off. In another example, based on the state of the input configuration command, the signal input of the output device 440 is set autonomously according to the compatibility status of the selected output audio signal 434 sent to the output device 440. For example, the compatibility status may indicate whether a SPDIF interface, a TOSLINK interface, or an analog interface is compatible with the selected output audio signal 434.

For example, based on the state of sound processing configuration information (e.g., DSP setting), the sound setting is set autonomously for the output device 440. For example, based on the volume setting state, the volume for the output device 440 is set autonomously.

In one example, the automatic configuration controller 470 also includes a visual indicator 478. In one example, based on the input state 477, indicate the input state 477 visually using the visual indicator 478. For example, the visual indicator 478 may be based on multispectral display elements, such as multi-color light emitting diodes (LEDs). For example, a unique visual indicator color may indicate the input state 477. For example, a flashing visual indicator first color may indicate that no input signal has been received and a flashing visual indicator second color may indicate that more than one input signal has been received. In one example, a flashing visual indicator may indicate a fault condition (e.g., no input signal, more than one input signal, etc.)

Figure 5:
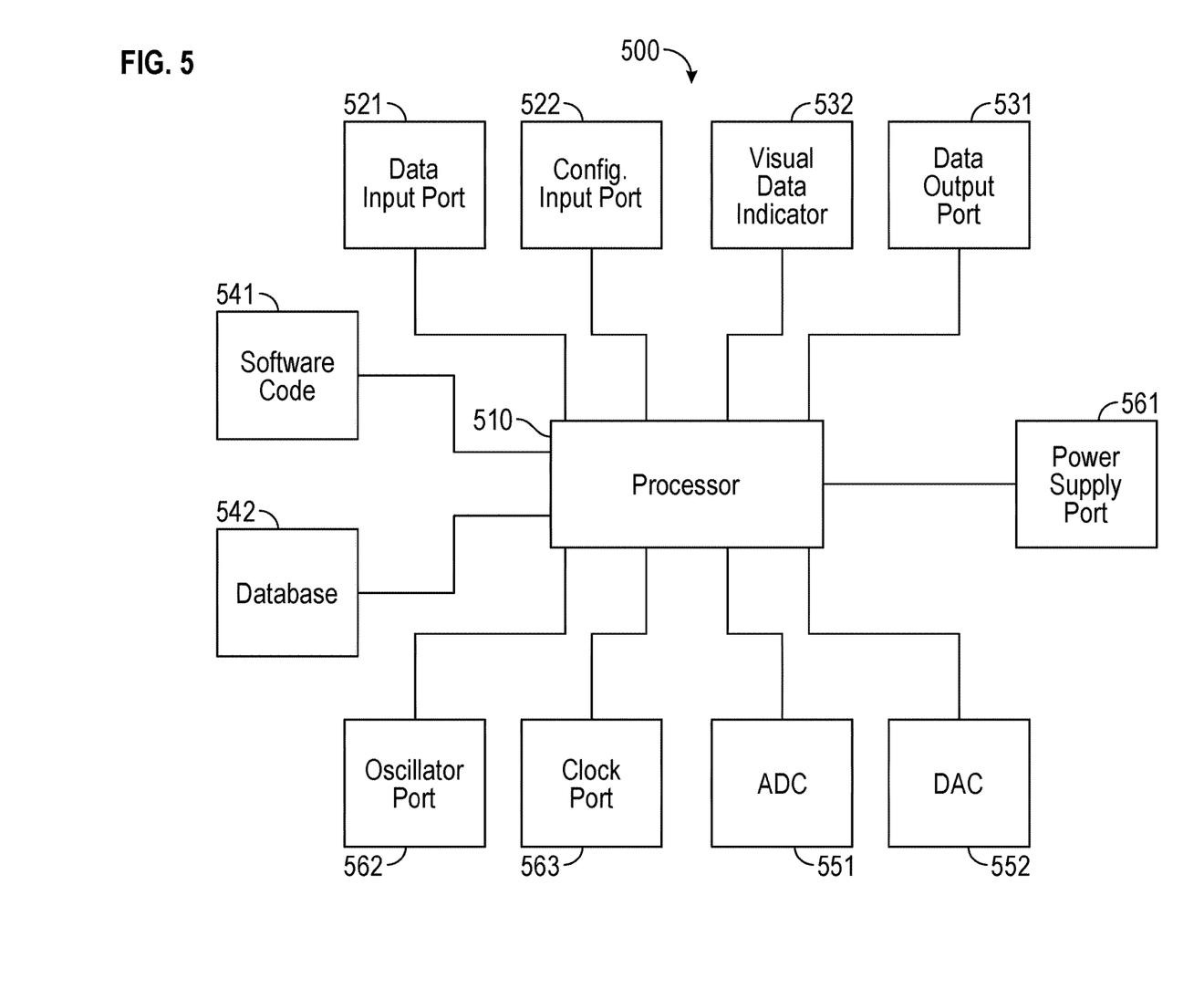
FIG. 5 illustrates an example block diagram of an automatic configuration controller.

FIG. 5 illustrates an example block diagram of an automatic configuration controller 500. For example, the automatic configuration controller 500 functions as a signal sensing automatic device configurator (e.g., input selector). In one example, a processor (e.g., CPU) 510 performs arithmetic, logical and symbolic computation and processing of a plurality of signal inputs to produce a plurality of signal outputs. In one example, the processor 510 is a 16 bit central processing unit, for example, a Texas Instruments MSP430FR2355. For example, the processor 510 provides all functioning logic and execution of all commands and timing according to programmed software code 541.

For example, a data input port 521 serves as an input interface to ingest source information content. In one example, the data input 521 receives the configuration status input 471 to sense the input state 477 of the audio distributor 430. For example, the data input port 521 is a 1 ⅛ in. smart input port (e.g., labeled "Sensing In") which provides auto-sensing across analog, SPDIF and TOSLINK interfaces. For example, the data input port 521 is connected to an audio input port in one of a plurality of standard interfaces, such as analog, SPDIF, TOSLINK, etc. In one example, the plurality of standard interfaces may be carried over a same single connector. In one example, the source information content may be audio content 203.

For example, a data output port 531 serves as an output interface to produce destination information content. In one example, the data output port 531 transmits the plurality of configuration commands 472 to output device 440 via configuration path 473. For example, the data output port 531 is a 1 ⅛ in. female 2 pin jack to plug in included infrared (IR) emitter (e.g., labeled "IR Out") which provides all control signaling (e.g., Power On, Input Select, DSP Select, Volume level set, and Power Off) to a connected output device (e.g., output amplifier, AV receiver, etc.) under the control of the automatic configuration controller 500.

In another example, the processor 510 may also include a configuration input port 522 to receive configuration information. In one example, the configuration input port 522 is implemented as the external switch inputs 474 to set configuration parameters 475. For example, the configuration input port 522 may include a plurality of dual inline package (DIP) switches for programming or setting a configuration state.

For example, the configuration input port 522 may have 10 DIP switches with the following functions:

Switches 1-4 specify one of up to 16 equipment brands to be controlled (e.g., Sony, Yamaha, Denon, Marantz, etc.)
Switch 5 controls "Auto Off" feature (on/off)
Switch 6 controls timing of "Auto Off" feature (e.g., 5 min/15 min) if Switch 5 is on
Switch 7 controls DSP command (on/off)
Switch 8 controls volume command (on/off)
Switch 9 controls volume command level (e.g., 25 %/50 %)
Switch 10 controls input sensitivity (high/low).

In one example, the configuration input port 522 may select a different input on the output device, e.g., receiver, via a DIP switch setting (e.g., a selection between Audio2 or Audio3 depending on DIP switch setting).

For example, the processor 510 may also include a visual data indicator 532 to display a system state. For example, the visual data indicator 532 may display power on status, fault states, synchronization state, etc. For example, the visual data indicator 532 may be a tri-color light emitting diode (LED) (labeled as "Signal Type") capable of displaying solid or flashing colors to indicate various states. For example, the visual data indicator 532 may display the following states:

Solid blue: SPDIF audio
Solid red: optical (e.g., TOSLINK) audio
Solid yellow: analog audio
Flashing yellow :too many inputs
Flashing red: no input
Off: no power.

For example, the processor 510 may be instructed to perform a set of operations by software code 541. For example, the software code 541 may be a set of instructions written in a high-level language such as C, Java, Python, object-oriented code, etc. or in a low-level language such as assembly code or machine instructions. For example, software code 541 contains proprietary algorithms and subroutines that scan an incoming signal for a correct volume level and then executes command sequences (e.g., IR command sequences) from a database or memory 542 to configure a connected output device (e.g., output amplifier, AV receiver, etc.).

In one example, the software code 541 contains all logic to execute all selected features of the connected output device. In addition, the processor 510 may access the database or memory 542 to retrieve stored information, such as configuration data, fault data, etc.

In one example, the database or memory 542 is an internal repository of a plurality of command sequences (e.g., IR command sequences) in a specified format (e.g., hexadecimal format). For example, the plurality of command sequences may be a total of N command sequences, where N=a product of a number of equipment brands and a number of commands per equipment brand. In one example, N=96 and the number of equipment brands is 16 and the number of commands per equipment brand is 6. In one example, the plurality of command sequences is used for executing a desired command according to programming in the configuration input port 522.

For example, the processor 510 may access an analog information input by using an analog/digital converter 551. In one example, the analog/digital converter (ADC) 551 converts an input analog signal representing an analog information input to input digital symbols by sampling and quantizing the input analog signal into a digital representation. For example, the ADC 551 is a specialized internal circuit inside the processor 510 which converts analog information to digital information.

For example, the processor 510 may produce analog information output by using digital/analog converter 552. In one example, the digital/analog converter (DAC) 552 converts output digital symbols into an output analog signal representing an analog information output by synthesizing the output analog signal from the output digital symbols. For example, the DAC 552 is a specialized internal circuit inside the processor 510 which converts digital information to analog information. In one example, the analog information may be measured and used for triggering command sequences (e.g., IR command sequences) to configure a connected output device (e.g., output amplifier, AV receiver, etc.).

For example, the processor 510 may require other auxiliary inputs for proper functioning. In one example, a power supply port 561 provides a regulated dc voltage input (e.g., from a power supply) as a dc power source for processor 510. For example, the regulated dc voltage input runs logic and functions, such as 5 v USB port or a coaxial barrel for DC power with an adapter.

In one example, an oscillator port 562 provides an oscillator signal input for processor 510. In one example, a clock port 563 provides a clock signal input for processor 510 to regulate sequential state transitions in the processor 510 in a synchronous manner. In one example, the oscillator signal input and the clock signal input are internal components of processor 510 and provide synchronization and timing across all connections and measurements.

Figure 6:
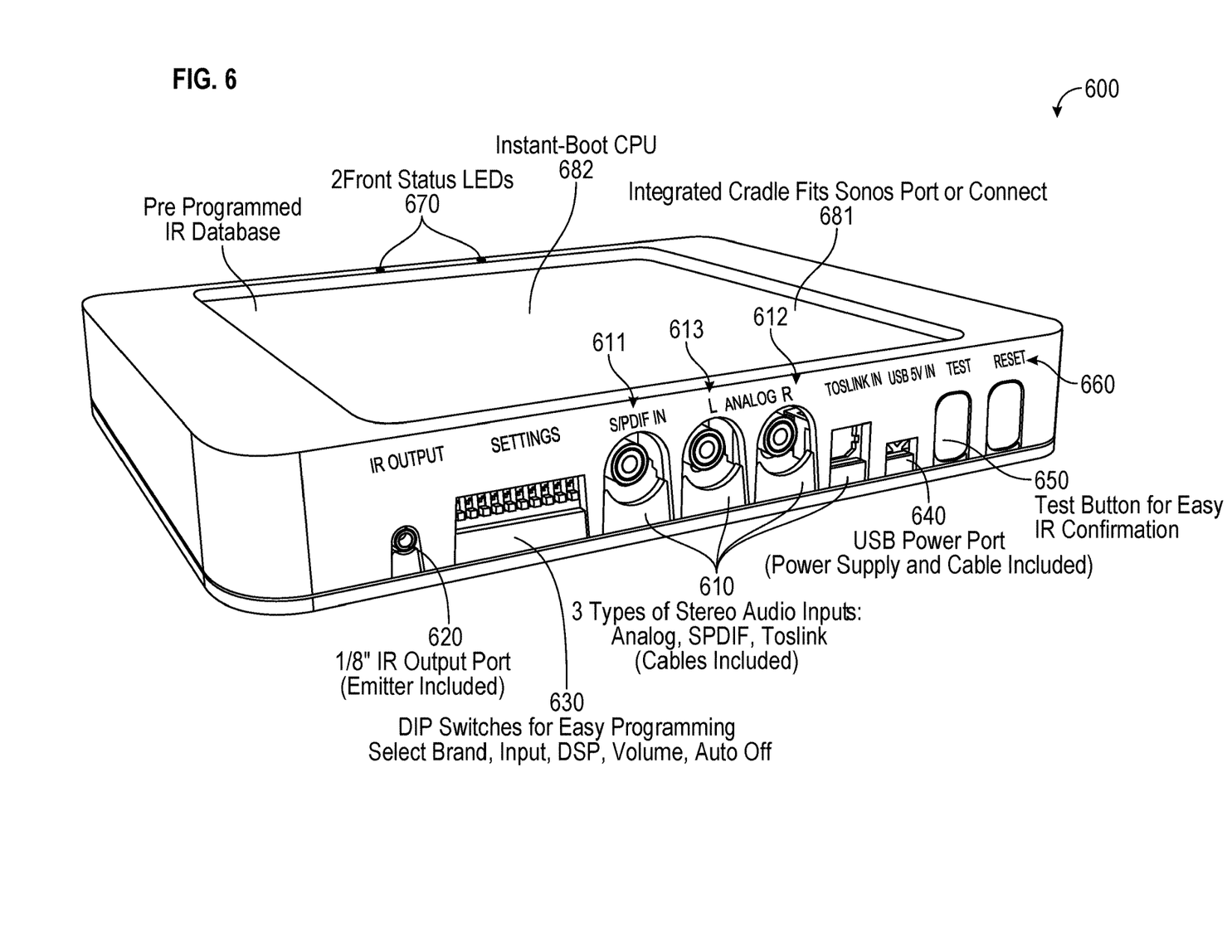
FIG. 6 illustrates an example implementation of the automatic configuration controller.

FIG. 6 illustrates an example implementation of the automatic configuration controller. In one example, the automatic configuration controller is a signal-sensing automatic device configurator. For example, FIG. 6 illustrates the automatic configuration controller 600 which includes a configuration status input 610 with a plurality of audio input ports which are compatible with a plurality of standard interfaces. For example, the plurality of standard interfaces may be a SPDIF interface, a TOSLINK interface, an analog interface, etc. For example, a first audio input port of the plurality of audio input ports may be the SPDIF interface with a SPDIF connector 611. For example, a second audio port of the plurality of audio input ports may be the TOSLINK interface with a TOSLINK connector 612. For example, a third audio port of the plurality of audio input ports may be the analog interface with an analog connector 613. In one example, the analog connector 613 may be a pair of stereo analog connectors, e.g., a left stereo analog connector and a right stereo analog connector.

In one example, a central processing unit (CPU) of the automatic configuration controller may monitor a plurality of different standard interfaces simultaneously at the configuration status input. In one example, the plurality of different standard interfaces maps one-on-one to a plurality of audio input ports. In one example, the CPU may set a different input setting depending on which one of the plurality of standard interfaces is active. For example, if the analog interface is active, detection of the analog interface triggers an Audio1 setting (i.e., a first input setting). For example, if the SPDIF interface is active, detection of the SPDIF interface triggers an Audio2 setting (i.e., a second input setting). For example, if the TOSLINK interface is active, detection of the TOSLINK interface triggers an Audio3 setting (i.e., a third input setting). One skilled in the art would understand that although three different input settings are disclosed herein, that other quantities of input settings are also within the scope and spirit of the present disclosure.

For example, FIG. 6 illustrates an output port 620 which connects to a configuration path 621 (not shown). In one example, a central processing unit (CPU) 682 through the output port 620 sends a plurality of configuration commands (e.g., configuration commands 472) to the output device 440 (shown in FIG. 4) via the configuration path 621. In one example, the plurality of configuration commands is based on configuration parameters 631. In one example, the plurality of configuration commands is based on a sensed input state which may be a SPDIF input state, a TOSLINK input state, an analog input state, etc. In one example, the input state may be sensed by detecting an active signal on one of the plurality of audio input ports. For example, the input state may be sensed by detecting an active signal on one of the standard interfaces such as the SPDIF interface, the TOSLINK interface, the analog interface, etc. In one example, sensing an input state is based on connector sensing and an input audio signal being received. In one example, the sensed input state is received by the configuration status input (e.g., 471, 610).

For example, the output port 620 may be an infrared (IR) output port, i.e., an IR emitter. In one example, the configuration path 621 is a directly wired path. For example, the directly wired path may use IR transmission over an IR transmission line. In another example, the configuration path 621 is an Ethernet connection. In one example, the configuration path is an indirect path, for example, a free space path. In one example, the indirect path may use an IR emitter to illuminate an IR aperture using free space transmission.

For example, FIG. 6 illustrates a plurality of external switch inputs 630 to set configuration parameters 631 (not shown). In one example, the plurality of external switch inputs 630 are dual inline package (DIP) switches. In one example, the plurality of external switch inputs 630 may be configured to select a different input on the output device, e.g., receiver, via a DIP switch setting (e.g., a selection between Audio2 or Audio3 depending on DIP switch setting).

For example, DIP switches are bilevel switches which may be configured to set configuration parameters 631 through a plurality of bilevel settings of the bilevel switches. For example, the configuration parameters 631 may include receiver brand name, input selection, volume level, volume command, a digital signal processor (DSP) command, an auto off time interval, an auto off enable, etc.

For example, the receiver brand name may be represented by N bits where up to $2^N$ unique receiver brand names may be represented. For example, if N=4, then up to $2^4$=16 unique receive brand names may be represented.

In one example, the input selection may select between two audio input ports. For example, the volume level may select between two distinct volume levels (e.g., 50% and 25%). In one example, the volume command may select between volume command enable and volume command disable. In one example, the DSP command may select between DSP enable and DSP disable. For example, the auto off time interval may select between two distinct time intervals, (e.g., 10 minutes and 1 minute). For example, the auto off enable may select between auto off enable and auto off disable.

In one example, an audio detection algorithm may be used which detects lower volume audio and reduce false shutoffs (when the auto off enable configuration parameter is enabled) by using a lower input volume sensitivity threshold when music is playing versus using a higher input volume sensitivity threshold when music has stopped beyond the auto off time interval (e.g., 1 minute or 10 minutes). In one example, the audio detection algorithm is executed by a central processing unit (CPU) of the automatic configuration controller. That is, in one example, the CPU is configured to detect an audio volume based on a first input volume sensitivity threshold (i.e., a lower input volume sensitivity threshold) and to detect no-audio volume following a time interval based on a second input volume sensitivity threshold (i.e., a higher input volume sensitivity threshold). In one example, the CPU executes an audio detection algorithm to detect the audio volume or the no-audio volume.

In one example, FIG. 6 illustrates a plurality of miscellaneous external ports, such as a power port 640, a test button 650, a reset button 660, a pair of front status light emitting diodes (LEDs) 670, etc. For example, the power port 640 may be a universal serial bus (USB) power port. For example, the test button 650 may be used to send a preprogrammed IR test pattern or to power off a device. For example, the reset button 660 may be used to reset a device. For example, the pair of front status LEDs 670 may be used indicate various states of the automatic configuration controller.

In addition, FIG. 6 illustrates a variety of other design features, such as an integrated cradle 681, a central processing unit (CPU) 682, a non-volatile random access memory (RAM) 683 (not shown), a preprogrammed database 684 (not shown), etc. In one example, the preprogrammed database 684 may provide a preprogrammed IR database for each unique receiver brand name specified in the receiver brand name of the configuration parameters 631.

Figure 7:
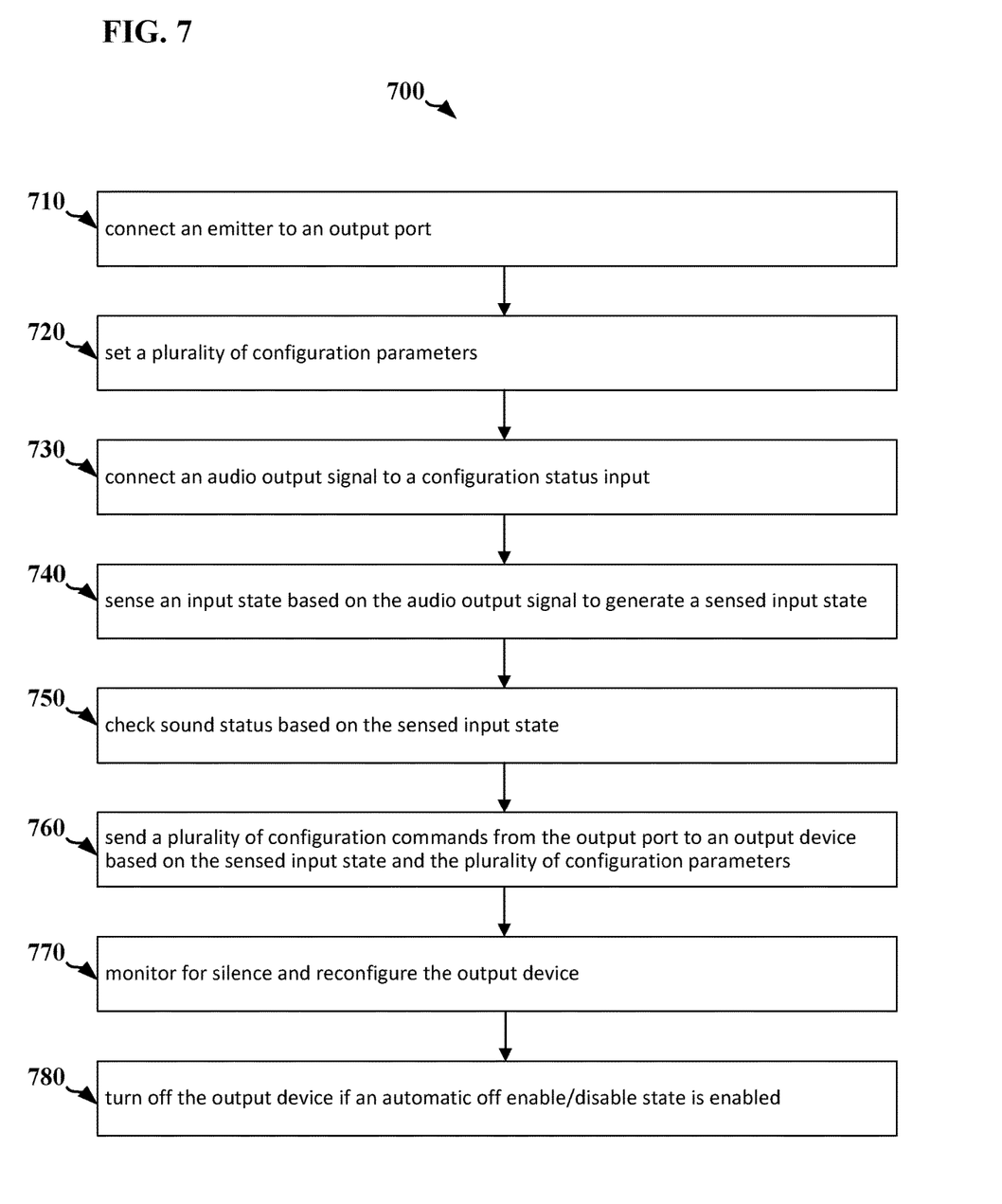
FIG. 7 illustrates an example flow diagram for an automatically configured digital audio distribution system.

FIG. 7 illustrates an example flow diagram 700 for an automatically configured digital audio distribution system. In block 710, connect an emitter to an output port. For example, the output port is an emitter output port, e.g., an IR emitter output port. For example, the output port connects to a configuration path. For example, the configuration path is a directly wired path. For example, the configuration path is an indirect path, for example, a free space path.

In block 720, set a plurality of configuration parameters. For example, the setting of the plurality of configuration parameters includes using external switch inputs. For example, the external switch inputs are a plurality of dual inline package (DIP) switches. In one example, powering up the automatically configured digital audio distribution system includes reading and storing the state of the external switch inputs to set the plurality of configuration parameters. For example, each external switch input has a configurable state (e.g., off or on, 0 or 1, yes or no, high or low, etc.) set by manual control. For example, the plurality of configuration parameters may include receiver brand name, input selection, volume level, volume command, digital signal processor (DSP) command, auto off time interval, auto off enable, etc. In one example, the plurality of configuration parameters includes: output device type state, automatic off enable/disable state, automatic off hysteresis duration state, DSP enable state, volume control enable state, initial volume level state, automatic off hysteresis duration state, input sensitivity state.

For example, the external switch inputs are part of the plurality of external switch inputs 630 to receive configuration information. For example, the plurality of external switch inputs 630 may include a plurality of dual inline package (DIP) switches for programming or setting a configuration state.

In block 730, connect an audio output signal to a configuration status input. For example, the configuration status input comprises a plurality of audio input ports. For example, the configuration status input is compatible with a plurality of standard interfaces. For example, the standard interfaces may be a SPDIF interface, a TOSLINK interface, an analog interface, etc. For example, a first audio input port of the plurality of audio input ports may be the SPDIF interface with a SPDIF connector. For example, a second audio port of the plurality of audio input ports may be the TOSLINK interface with a TOSLINK connector. For example, a third audio port of the plurality of audio input ports may be the analog interface with an analog connector. In one example, the analog connector may be a pair of stereo analog connectors, e.g., a left stereo analog connector and a right stereo analog connector.

In block 740, sense an input state based on the audio output signal to generate a sensed input state. For example, the sensed input state may be a SPDIF input state, a TOSLINK input state, an analog input state, etc. In one example, the input state may be sensed by detecting an active signal on one of the plurality of audio input ports. For example, the input state may be sensed by detecting an active signal on one of the standard interfaces such as the SPDIF interface, the TOSLINK interface, the analog interface, etc. In one example, a selected output audio signal is sent to an output device (e.g., audio amplifier). In one example, sensing an input state is based on connector sensing and an input audio signal being received. For example, based on the input state, continue monitoring an input associated with the input state and do not monitor other input types. In one example, based on the input state, indicate the input state visually using a visual indicator. For example, the visual indicator may be based on multispectral display elements, such as multi-color light emitting diodes (LEDs). For example, a unique visual indicator color may indicate the input state. For example, a flashing visual indicator first color may indicate that no input signal has been received and a flashing visual indicator second color may indicate that more than one input signal has been received. In one example, a flashing visual indicator may indicate a fault condition (e.g., no input signal, more than one input signal, etc.). In one example, the configuration status input 610 serves as an input interface to ingest source information content. For example, the configuration status input 610 is a 1 ⅛ in. smart input port (e.g., labeled "Sensing In") which provides auto-sensing across analog, SPDIF and TOSLINK interfaces. For example, the configuration status input 610 is connected to an audio input in one of a plurality of standard interfaces, such as analog, SPDIF, TOSLINK, etc. In one example, the plurality of standard interfaces may be carried over a same single connector. In one example, the configuration status input 610 senses an input state of the audio distributor 430.

In block 750, check sound status based on the sensed input state. For example, measure a sound amplitude or power level of the input audio signal with the sensed input state. In one example, if the sound amplitude or power level is less than an input volume sensitivity threshold (e.g., standard or high sensitivity), then do nothing. In one example, if the sound amplitude or power level is greater than or equal to the input volume sensitivity threshold, then execute block 760 to power on an output device. In one example, repeat block 750 until sound amplitude or power level exceeds the volume sensitivity threshold.

In block 760, send a plurality of configuration commands from the output port to an output device based on the sensed input state and the plurality of configuration parameters. For example, the plurality of configuration commands is based on one or more of the following: receiver brand name, input selection, volume level, volume command, digital signal processor (DSP) command, auto off time interval, auto off enable, etc. For example, the plurality of configuration commands depends on sensing the SPDIF input state, the TOSLINK input state, or the analog input state.

In one example, the output device is a connected output device (i.e., an output device connected to the automatic configuration controller 600). In one example, send a power on command autonomously via a configuration path to the output device. For example, based on a state of a power on/off command and if the automatic off enable/disable state is enabled, the output device may be autonomously powered on or off. In another example, based on the state of the input configuration command, the signal input of the output device 440 is set autonomously according to a compatibility status of a selected output audio signal sent to the output device. For example, the compatibility status may indicate whether a SPDIF interface, a TOSLINK interface, or an analog interface is compatible with the selected output audio signal.

In one example, the plurality of configuration parameters is retrieved from the plurality of external switch inputs 630 to receive configuration information. For example, the plurality of external switch inputs 630 may include a plurality of dual inline package (DIP) switches for programming or setting a configuration state. In one example, the configuration path is connected to output port 620 serves as an output interface to produce destination information content. For example, the data output port 531 is a 1 ⅛ in. female 2 pin jack to plug in included IR emitter (e.g., labeled "IR Out") which provides all control signaling (e.g., Power On, Input Select, DSP Select, Volume level set, and Power Off) to a connected output device (e.g., output amplifier, AV receiver, etc.) until the control of the automatic configuration controller 600.

In one example, the output device is an audio amplifier which amplifies an output audio signal to produce an amplified output audio signal. For example, the amplified output audio signal may be transported to an audio speaker using a first output line. For example, the amplified output audio signal may be transported to an auxiliary audio speaker, for example, a sub-woofer speaker using a second output line. In one example, the amplified output audio signal may be transported to both the audio speaker and the auxiliary audio speaker simultaneously using both the first output line and the second output line. In another example, the output device is an audio-video (AV) receiver.

In block 770, monitor for silence and reconfigure the output device. In one example, based on the sensed input device type state, determine a current sound amplitude or power level of the input audio signal with the input state. If the current sound amplitude or power level is less than the input volume sensitivity threshold (e.g., silence detected), initiate a silence timer and continue monitoring the current sound amplitude or power level. In one example, if the current sound amplitude or power level equals or is greater than the input volume sensitivity level before the silence timer reaches a time duration set by an automatic off hysteresis duration state, then reset the silence timer to zero and restart block 770. In one example, if the current sound amplitude or power level is less than the input volume sensitivity level and the time reaches the time duration set by the automatic off hysteresis duration state (e.g., silence detected over the time duration), then continue to block 780.

In block 780, turn off the output device if an automatic off enable/disable state is enabled. In one example, based on the output device type state of the plurality of configuration parameters, send a power off command autonomously via the configuration path to the output device. For example, based on a state of a power on/off command and if the automatic off enable/disable state is enabled, the output device may be autonomously powered off. In one example, execute block 780 after a pause duration (e.g., 5 second pause duration) to confirm power off of the output device. In one example, if the automatic off enable/disable state is disabled, execute block 780 to confirm power on of the output device.

In one aspect, one or more of the steps in FIG. 7 may be executed by one or more processors which may include hardware, software, firmware, etc. In one aspect, one or more of the steps in FIG. 7 may be executed by one or more processors which may include hardware, software, firmware, etc. The one or more processors, for example, may be used to execute software or firmware needed to perform the steps in the flow diagram of FIG. 7. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for implementing the apparatus and/or method disclosure presented herein. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other.

The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

One skilled in the art would understand that various features of different embodiments may be combined or modified and still be within the spirit and scope of the present disclosure.

What is claimed is:

1. A system comprising:
   an automatic configuration controller comprising:
   a) a plurality of external switch inputs configured to set one or more configuration parameters;
   b) a configuration status input configured to be compatible with a standard interface;
   c) an output port;
   d) a central processing unit (CPU) coupled to the output port, the plurality of external switch inputs and the configuration status input, wherein the CPU is configured to send a plurality of configuration commands based on the one or more configuration parameters and configured to send the plurality of configuration commands based on a sensed input state; and
   e) a preprogrammed database coupled to the CPU, wherein the preprogrammed database is configured to provide a preprogrammed IR database for each unique receiver brand name specified in a receiver brand name;
   an audio distributor configured to provide an input state to the configuration status input; and
   an output device configured to receive a plurality of configuration commands from the output port.

2. The system of claim 1, further comprising a configuration path coupled to the output device and the output port.

3. The system of claim 2, wherein the configuration path transports the plurality of configuration commands.

* * * * *